(12) United States Patent
Wieczorek et al.

(10) Patent No.: US 7,681,910 B2
(45) Date of Patent: Mar. 23, 2010

(54) SIDE AIRBAG CONNECTOR ASSEMBLY

(75) Inventors: Joseph P. Wieczorek, Lake Orion, MI (US); Timothy O. Hamlin, Warren, MI (US); Bryan Busha, Grand Blanc, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 397 days.

(21) Appl. No.: 11/824,167

(22) Filed: Jun. 28, 2007

(65) Prior Publication Data

US 2009/0001784 A1 Jan. 1, 2009

(51) Int. Cl.
*B60R 21/20* (2006.01)
(52) U.S. Cl. ................. 280/730.2; 280/728.2
(58) Field of Classification Search .............. 280/728.2, 280/730.2
See application file for complete search history.

(56) References Cited

U.S. PATENT DOCUMENTS

| | | | |
|---|---|---|---|
| 5,498,030 A | 3/1996 | Hill et al. | |
| 5,553,887 A | 9/1996 | Karlow et al. | |
| 5,630,615 A | 5/1997 | Miesik | |
| 5,651,582 A | 7/1997 | Nakano | |
| 5,678,853 A | 10/1997 | Maly | |
| 5,749,597 A | 5/1998 | Saderholm | |
| 5,762,363 A | 6/1998 | Brown et al. | |
| 5,806,882 A | 9/1998 | Stein et al. | |
| 5,816,610 A | 10/1998 | Higashiura et al. | |
| 5,860,673 A | 1/1999 | Hasegawa et al. | |
| 5,863,063 A | 1/1999 | Harrell | |
| 5,890,734 A | 4/1999 | Saderholm | |
| 5,927,749 A | 7/1999 | Homier et al. | |
| 5,938,232 A | 8/1999 | Kalandek et al. | |
| 5,967,546 A * | 10/1999 | Homier et al. | 280/730.2 |
| 5,967,603 A | 10/1999 | Genders et al. | |
| 6,045,151 A | 4/2000 | Wu | |
| 6,074,003 A | 6/2000 | Umezawa et al. | |
| 6,095,602 A | 8/2000 | Umezawa et al. | |
| 6,155,593 A | 12/2000 | Kimura et al. | |
| 6,189,916 B1 | 2/2001 | Bowers et al. | |
| 6,206,410 B1 | 3/2001 | Brown | |
| 6,213,550 B1 | 4/2001 | Yoshida et al. | |
| 6,237,934 B1 | 5/2001 | Harrell et al. | |
| 6,254,122 B1 | 7/2001 | Wu et al. | |
| 6,299,197 B1 | 10/2001 | Mueller | |
| 6,352,304 B1 | 3/2002 | Sorgenfrei | |
| 6,357,789 B1 * | 3/2002 | Harada et al. | 280/730.2 |
| 6,364,347 B1 | 4/2002 | Holdampf et al. | |
| 6,382,665 B2 | 5/2002 | Holdampf et al. | |
| 6,386,577 B1 | 5/2002 | Kan et al. | |
| 6,439,597 B1 * | 8/2002 | Harada et al. | 280/728.2 |
| 6,523,237 B1 | 2/2003 | Kopec et al. | |
| 6,578,911 B2 | 6/2003 | Harada et al. | |
| 6,588,838 B1 | 7/2003 | Dick, Jr. et al. | |

(Continued)

Primary Examiner—Ruth Ilan
(74) Attorney, Agent, or Firm—Raggio & Dinnin, P.C.

(57) ABSTRACT

A connector assembly for use with a side airbag having a tearable seam in a vehicle seat is disclosed. The connector assembly includes a clip member having a slot near one end thereof and an inner chute connected to the clip member via the slot. The connector assembly also includes a rod releaseably secured to the clip member. An outer chute is connected to the rod and the seam on the opposite end thereof. The chute will allow for proper guidance of the airbag during deployment from the seat in a crash situation.

20 Claims, 3 Drawing Sheets

U.S. PATENT DOCUMENTS

| | | |
|---|---|---|
| 7,134,685 B2 | 11/2006 | Panagos et al. |
| 7,134,686 B2 | 11/2006 | Tracht et al. |
| 2006/0113772 A1* | 6/2006 | Tracht .................... 280/730.2 |
| 2006/0113773 A1* | 6/2006 | Tracht .................... 280/730.2 |
| 2006/0131848 A1* | 6/2006 | Miyake et al. ........... 280/730.2 |
| 2008/0100044 A1* | 5/2008 | Cho ........................ 280/730.2 |

* cited by examiner

SIDE AIRBAG CONNECTOR ASSEMBLY

BACKGROUND OF THE INVENTION

1. Field of the Invention

The subject invention generally relates to side airbags, and more particularly relates to a side airbag connector assembly for use in an automotive seat using a chute to direct the airbag during deployment thereof.

2. Description of Related Art

It is well known in the prior art of automotive vehicles to provide an airbag assembly for protection of a vehicle occupant. These prior art airbag assemblies typically are deployed from in front of a person or from a seat or roof line of an automotive vehicle. The airbag generally includes an inflatable cushion structure in communication with a gas emitting inflator. When predetermined vehicle conditions occur, an airbag cushion is deployed outwardly from its stored position in a dashboard, roof, or seat into a position between the occupant and the interior portions of a vehicle against which the occupant might otherwise come in contact with. The use of the airbag cushion between the occupant and interior portions of the vehicle may provide a cushioning effect for the occupant against hard impacts with the interior portions of the vehicle.

Many prior art airbag systems for use in motor vehicles may have an airbag arranged within a seat. This airbag may deploy generally through a sewn seam in a cover material of the seat. Many of these prior art seat side airbags penetrate the seat cover by tearing open the sewn seam in the seat cover. Some of these prior art systems also include a chute that will help guide the airbag during deployment through the seam of the seat cover. However, there have been problems in the prior art with such systems such as but not limited to ballooning of the seat cover occurring prior to failure of the seam, an increased amount of time required for the airbag to exit the seat, and the airbag deploying in a position that does not properly place the airbag between the individual and the interior surfaces of the vehicle. Furthermore, there also have been problems with prior art seat side airbag assemblies in verifying that the seat side airbag assembly is properly arranged within the seat. However, many of these prior art seat side airbag assemblies have generally been used for protection of occupants, and are especially useful in protection against head and torso injuries.

Therefore, there is a need in the art for an improved connector assembly for use in a seat side airbag module. There also is a need in the art for an improved connector assembly for use with an airbag chute and a tearable seam in a vehicle seat. There also is a need in the art for a continuous tearable seam used in conjunction with a side airbag chute having a connector assembly according to the present invention. There also is a need in the art for a side airbag that deploys quicker than prior art versions and deploys in a predetermined position from the seat during every deployment thereof.

SUMMARY OF THE INVENTION

One object of the present invention may be to provide an improved connector assembly for a side airbag module.

Another object of the present invention may be to provide a seat side airbag connector assembly for a vehicle seat that will allow for a quicker and easier deployment of an airbag through a seat cover.

Still another object of the present invention may be to provide a method of connecting an airbag chute for a seat side airbag module such that the connector assembly verifies positive locking thereof via a visual and/or audible confirmation.

Still another object of the present invention may be to provide a connector assembly that is releaseably lockable and ensures easy installation and replacement of the seat side airbag within the vehicle seat.

Another object of the present invention may be to provide a seat side airbag connector assembly that provides for easy installation of an airbag module within a vehicle seat thus reducing manufacturing costs and time required to manufacture a vehicle seat assembly.

Still another object of the present invention may be to provide a way to properly guide a deploying airbag through a seam of a vehicle seat.

To achieve the foregoing objects, a connector assembly for use with a side airbag in a vehicle seat is disclosed. The connector assembly includes a clip member having a slot near one end thereof and an inner chute member connected to the clip member via the slot. The connector assembly also includes a rod which is releaseably secured to the clip member. An outer chute is connected to the rod thus forming an enclosure for a side airbag module within the vehicle seat. The inner and outer chute may be used to guide the airbag to its proper position upon deployment from the seat and also to decrease the deployment time of the airbag to its fully deployed position. The connector assembly may also allow for quicker and easier installation or replacement of a side airbag module within the vehicle seat.

One advantage of the present invention may be that it provides a novel and improved connector assembly for use in a seat of a vehicle having a side airbag.

Still a further advantage of the present invention may be that it allows for a quicker and easier deployment of an airbag from the vehicle seat.

Still another advantage of the present invention may be that it provides for a clip member and rod to be used in connecting an airbag chute around a seat frame and airbag module.

Still yet another advantage of the present invention may be that the connector assembly has a clip member and rod that may provide a visual and/or audible confirmation of a positive lock therebetween.

Still another advantage of the present invention is that it may provide for a tear along a seam to occur more quickly and completely thus allowing for more control of the deployment process of the airbag from the seat.

Still another advantage of the present invention may be that the connector assembly may reduce the complexity of manufacturing and installing a side airbag module within a vehicle seat.

Yet another advantage of the present invention may be that the connector assembly will reduce the weight and complexity of the side airbag module within a vehicle seat.

Other objects, features and advantages of the present invention will become apparent from the subsequent description and the appended claims, taken in conjunction with the accompanying drawings.

DESCRIPTION OF THE EMBODIMENT(S)

Figure 1:
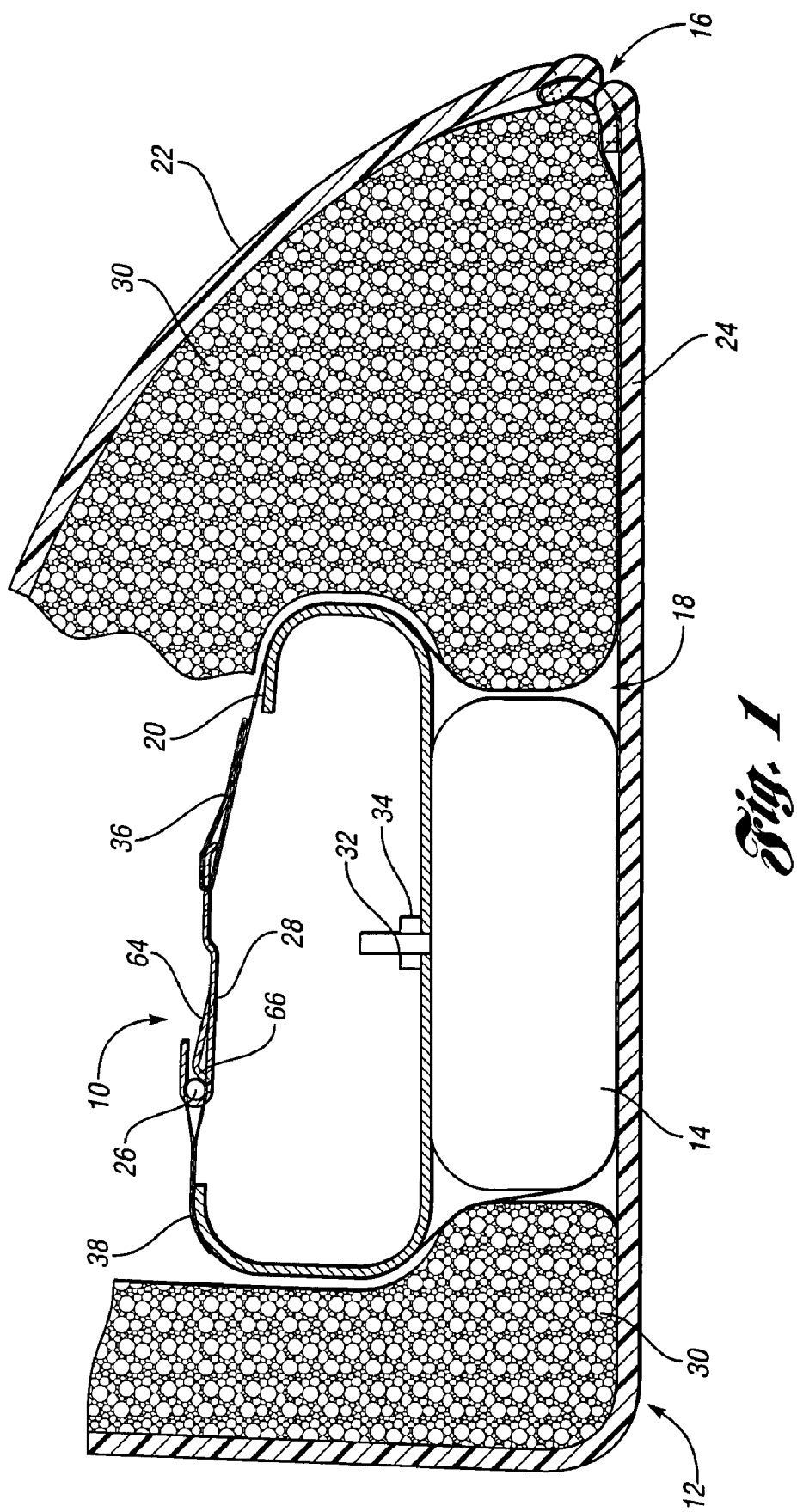
FIG. 1 shows a partial cross section of a seat having a connector assembly according to the present invention.

Referring to the drawings, a connector assembly 10 for use in a seat 12 of a vehicle having a side airbag module 14 arranged therein is disclosed. It should be noted that the upholstery seam 16 shown in the drawings is for use on a seat 12 having a side airbag 14 deployed therefrom. It should further be noted that any other type of seam 16 apart from that shown in the drawings may also be used in connection with a connector assembly 10 and airbag chute 18 according to the present invention. In one contemplated embodiment, a continuous side airbag seam 16 as described and disclosed in a patent application filed by the present Applicant may also be used. That application having provisional patent application No. 60/931,964 is hereby incorporated by reference. The present invention may be used on any type of seat and with any type of seam and it may be used with any type of material, such as laminate backed material, non-laminate backed material, or any other known covering material that is used to cover a seat, such as leather, cloth, vinyl, imitation leather, or any other known material used for vehicle seats. The use of the connector assembly 10 and associated seam 16 according to the present invention will allow for quicker and easier tearing of the seam 16 and guidance of the airbag 14 during deployment of the airbag in a crash situation. Generally, the tearable seam 16 used according to the present invention is located directly adjacent to an airbag 14 stored within the seat 12 wherein the airbag module 14 generally is connected to a frame 20 of the seat 12. It should be noted that generally only a predetermined portion of the seam 16 will tear allowing the airbag 14 to deploy between the occupant and the interior surfaces of the vehicle. The side airbag module 14 may be guided during its deployment in a crash situation by an airbag chute 18 that is connected to a first and second material or cover 22, 24 of the seat 12 at the seam 16 as shown in the drawings. Generally, during a crash an airbag inflator, which is arranged within the side airbag module 14 upon signal from the vehicle computer, will release a hot gas to inflate the airbag 14 and expel the airbag 14 from the seat 12 through the seam 16 via the airbag chute 18 into proper position between the occupant of the vehicle and the interior surfaces of the vehicle. The use of the connector assembly 10 of the present invention will allow for the airbag chute 18 to more precisely guide the deployment of the airbag 14 and in conjunction with the tearable seam 16 may require less force and provide for more consistent tearing of the seam 16 and deployment of the airbag 14 into the proper position between the occupant and the interior surfaces of the vehicle. Furthermore, the use of the connector assembly 10 with the side airbag module 14 may also reduce manufacturing costs and reduce the time needed to assemble a complete seat assembly by providing a visual and audible confirmation of a positive lock between a rod 26 and clip member 28 of the connector assembly 10. The audible signal will be present via a clicking sound of the rod 26 engaging surfaces of the clip member 28 while the visual will be the installer of the airbag module 14 verifying that the rod 26 is arranged and aligned at a predetermined position with respect to the clip member 28.

Figure 2:
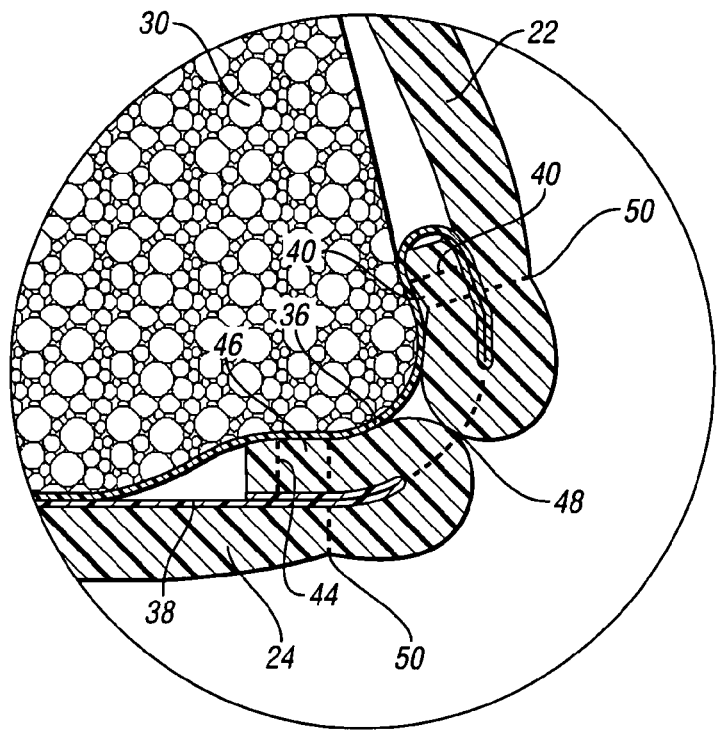
FIG. 2 shows a close up of the seam of a seat according to the present invention.
Figure 3:
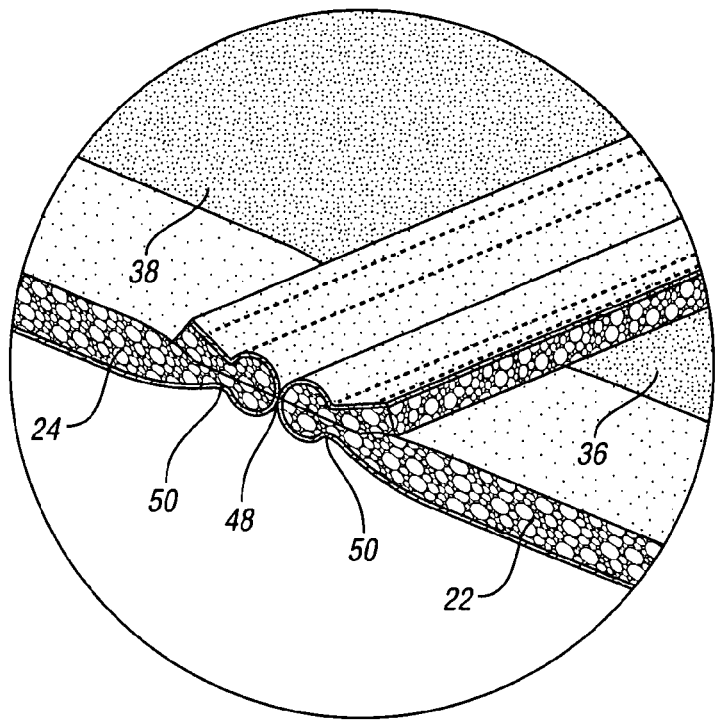
FIG. 3 shows a close up of a seam according to the present invention.
Figure 4:
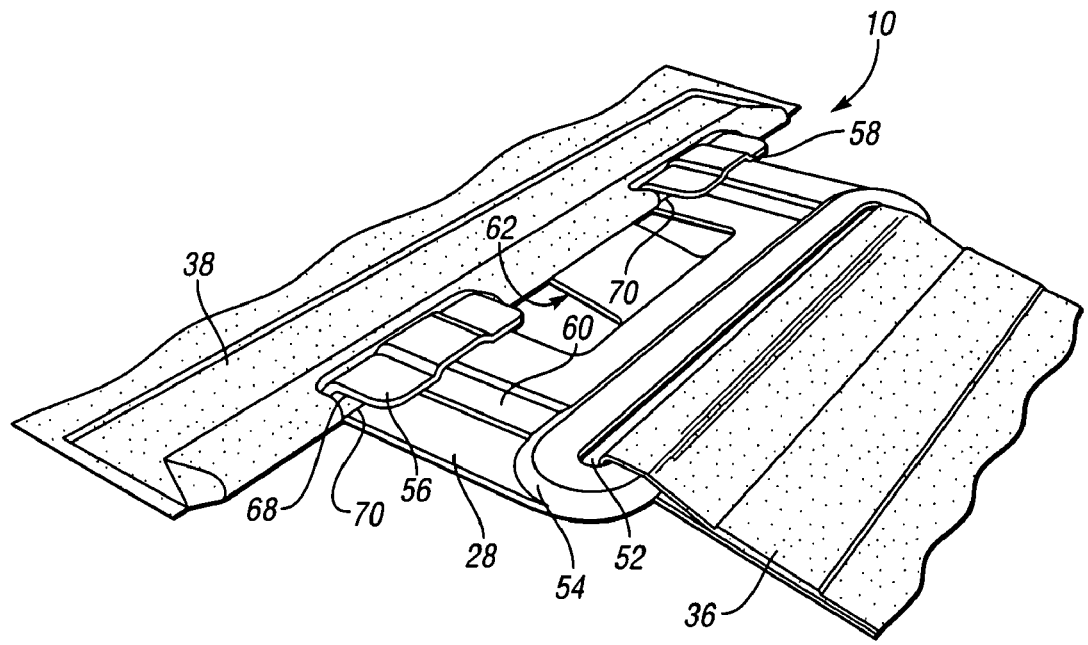
FIG. 4 shows a connector assembly according to the present invention.
Figure 5:
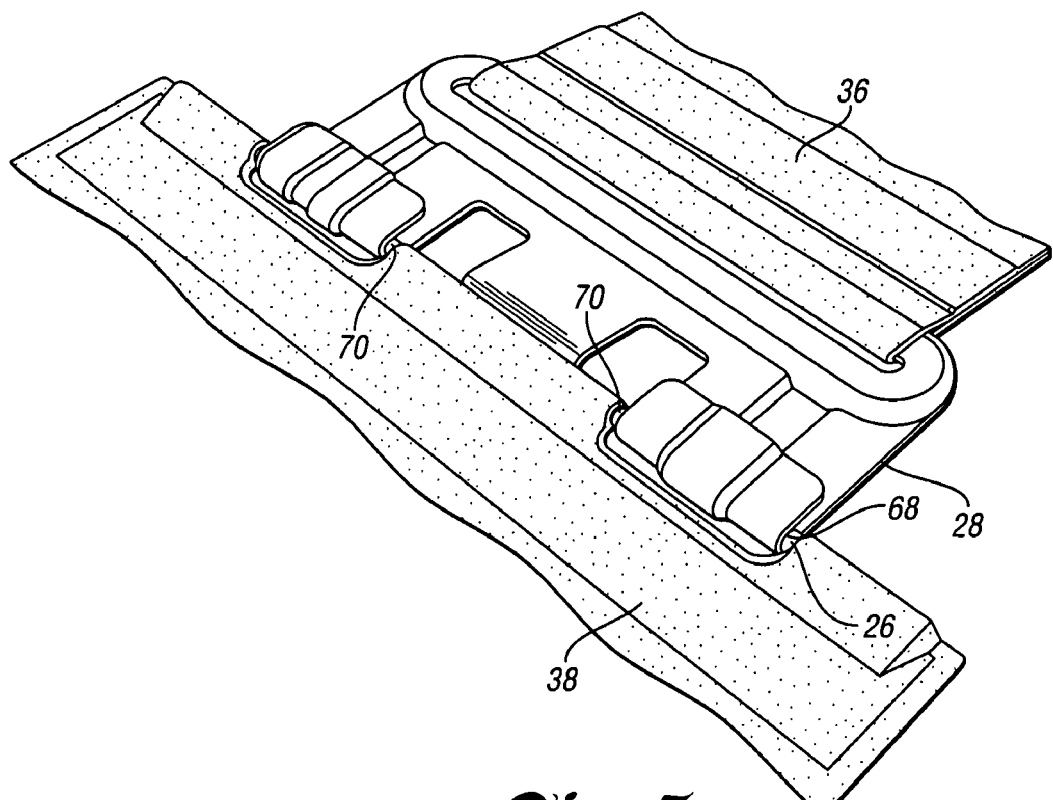
FIG. 5 shows a top view of a connector assembly according to the present invention.

As shown in FIGS. 1 through 5, a first and second trim cover or material 22, 24 will be used to cover the seat 12 of an automotive or other type of vehicle. The trim cover 22, 24 will be arranged over a seat frame 20 which in the embodiment shown is a seat back frame, and a side airbag module 14. The cover 22, 24 also may be arranged over a seat foam 30 arranged around the seat back frame 20 and airbag module 14 in any known manner. Generally, the side airbag module 14 may include the airbag 14, the inflator and the associated electronics necessary to perform such deployment operations. It should be noted that the side airbag module 14 is generally connected to the seat back frame 20 by any known fastening technique, the technique shown in the embodiment generally uses a threaded bolt 32 or the like and a nut 34 to secure the side airbag module 14 to the seat back frame 20. The seat back frame 20 and side airbag module 14 may be surrounded, encapsulated, or covered by an airbag chute 18.

The airbag chute 18 generally includes two portions, the first is an inner chute member 36 and the second is an outer chute member 38. The inner chute facing or member 36 and the outer chute facing or member 38 generally are made of a nylon type material, however any other plastic, composite, artificial, natural, or any other known fabric or material may also be used for the inner and outer chute members 36, 38. The inner chute member 36 may have one end thereof connected to one of the trim covers 22 at the side airbag seam 16. A tack sew line 40 will connect the inner chute member 36 to a flap portion 42 of the first cover member 20. The outer chute member 38 will have one of its ends sewn via a tack sew line 44 to a flap 46 of the end of the second cover member 34. The first and second trim cover members 22, 24 will be joined together by a join seam 48 along an entire length thereof. The join seam 40 may be made of any known material such as those claimed in Applicant's prior patent application including but not limited to monofilament, or any other known thread type material. It should also be noted that the tearable side airbag seam 16 may be the continuous seam as also claimed by Applicant in its prior filed provisional patent application. In one embodiment shown in the present invention, a second french seam stitch line 50 will be arranged adjacent to the joint sew line 48 and the tack sew lines 40, 44. This will allow for a predetermined outer surface look for the vehicle seat 12 while also allowing for the seam 16 to be tunable to predetermined tear parameters. It should be noted that any known seam connecting methodology may be used to connect the two cover materials 22, 24 together at the tearable side airbag seam 16 and also to connect the chute members 36, 38 to the first and second cover materials 22, 24 to allow for proper guidance of the airbag 14 during the deployment process.

The inner and outer chute members 36, 38 may then be arranged between the seat cover 24 and seat foam 30 a predetermined distance and then encapsulate or surround both the side airbag module 14 and the seat back frame 20 to allow for proper securement and alignment of the airbag chute 18 within the vehicle seat 12 properly fastening or engaging the airbag chute 18 to the seat frame 20 to allow for the airbag chute 18 to properly use and guide the force created during ignition of the inflator gas within the airbag module 14 to properly deploy and inflate the airbag such that it will deploy through the tearable seam 16 in the vehicle seat 12 back or lower portion depending on the design of the side airbag module 14. Some prior art systems may not have had proper connection of the airbag chute 18 to a seat back frame 20 and thus may have effected the deployment of the side airbag thus reducing its effectiveness and sometimes even keeping the side airbag from completely deploying or from just bulging within the seat thus not providing the proper protection for the vehicle user.

A connector assembly 10 according to the present invention is used to secure one end of the inner chute member 36 to one end of the outer chute member 38. The connector assembly 10 may include a clip member 28 and a rod 26. The clip member 28 generally will be made of a metal material, however it should be noted that any other hard plastic, ceramic, composite or natural material may also be used for the clip member 28. The clip member 28 may generally have a slot 52 arranged near one end thereof. The slot 52 may extend a predetermined distance along a surface of the clip member 28 and extend a predetermined distance in from the edge or end of the clip member 28. The slot 52 as shown in the embodiment generally has an oval shape, however any other shaped slot may also be used. An end of the inner chute member 36 may be arranged through the slot 52 and secured to the slot 52 by any known methodology for securing a fabric. In the embodiment shown, the inner chute member end will be placed through the slot 52 and then folded back over an end portion of the clip member 28 such that the inner chute member 36 will be in contact with another portion of the inner chute member 36. Then any known fastening technique such as sewing, gluing, stapling or heat staking, or any other known mechanical or chemical fastening technique will be used to secure the end of the inner chute member 36 to the clip member 28. The clip member 28 may also have a raised area 54 on the end where the slot 52 is arranged. The slot 52 is generally located at a mid point of that raised area when viewed in cross section. The clip member 28 has generally J-shaped locking channel 56 arranged on the end of the clip member 28 opposite of the slot 52. Generally, in the embodiment shown, a first and second J-shaped channel 56, 58 are used. However, it should be noted that only one J-shaped channel or a plurality of J-shaped locking channels may also be used on the clip member 28. One of the J-shaped locking channels 56 is arranged near one side of the clip member 28 while the second J-shaped channel 58 is arranged near the other side of the clip member 28. Generally, the J-shaped channel 56, 58 may be arranged on a same or similar plane. In one embodiment the clip member 28 may include a groove 60 arranged generally along a mid point of each J-shaped channel 56, 58. It should be noted that any other shaped channel 56, 58 may be used on the clip member 28 other than the J-shaped channel as generally shown in the drawings. The use of the J-shaped channels on a same or similar plane will allow for the insertion of a rod 26 such that the rod 26 will engage the bottom or curved portion of the J-shaped channels 56, 58 when properly inserted therein.

The clip member 28 also may include a locking finger or locking tab 62 arranged between the first and second J-shaped locking channels 56, 58 of the present invention. Generally, the locking finger 62 may extend from a surface of the clip member 28 a predetermined distance. When viewed from a cross section the clip finger 62 generally will have a predetermined upward angle surface 64 extending from the clip member 28. The surface 64 extends a predetermined distance and then at the end the finger 62 may extend with an angled surface 66 in an opposite direction such that the angled surface 66 at the end of the finger 62 will extend down towards the bottom of the clip member 28. The finger 62 may be used to urge and provide a spring force in a direction upward away from the top surface of the clip member 28 against the rod 26 during insertion and holding of the rod 26 into the J-shaped channels 56, 58. It should be noted that a plurality of locking fingers 62 may also be arranged on the clip member 28.

It should also be noted that in another contemplated embodiment the locking finger may include a generally circumferential shaped groove on an end thereof wherein the groove generally will have a circumferential shape that will mimic the outer diameter of the rod 26 such that the rod 26 may be seated within the groove when the rod 26 is positively locked with relation to the clip member 28.

The rod 26 generally is made of a metal material, however any other type of material, such as hard plastic, ceramic, composite, natural material or any other known material may be used to form the rod 26. The rod 26 will have a predetermined length and diameter. The length and diameter will be chosen depending on the size of the clip member 28 and seat 12 used within the connector assembly 10. The rod 26 is arranged and secured within a pocket or sleeve 68 on an end of the outer chute member 38. The outer chute member 38 in one embodiment generally will have a sleeve or pocket 68 formed on the outer end thereof. The rod 26 may then be arranged within the sleeve or pocket 68 and securely held therein via any known fastening technique such as but not limited to tacking, sewing, interference fit, or any other known fastening technology, mechanical or chemical. In the embodiment shown the pocket or sleeve 68 formed in the end of the outer chute member 38 may have a first and second gap or window 70 therein. This first or second gap or window 70 may allow for the rod 26 to be exposed to the clip member 28 without fabric from the outer chute member 38 interfering therewith. It should be noted that it is contemplated to have one gap or window or multiple gaps or windows arranged along the edge of the outer chute member 38. It is also contemplated to use any other fastening technique other than a sleeve or pocket 68 to secure the rod 26 to the outer chute member 38 of the airbag chute 18. It should be noted that either the rod 26 or clip member 28 may be connected to the inner chute member 36 or the outer chute member 38 and vice versa.

The rod 26 and clip member 28 may be arranged such that the rod 26 may be releaseably securable to the clip member 28 such that when the rod 26 is arranged within the first and second J channels 56, 58 and engaged with the angled surface 66 on the end of the finger 62 the rod 26 will be positively locked to the clip member 28, thus positively locking the connector assembly 10 and positively securing the airbag chute 18 to the seat back frame 20, which will allow for proper deployment of the airbag 14 during a crash situation. During insertion of the rod 26 into the clip member J channels 56, 58 the installer will depress the rod 26 against the finger 62 thus urging the finger 62 towards the bottom of the clip member 28 and allowing the rod 26 to enter the opening of the J channel 56, 58 on both sides of the clip member 28. The installer will then keep moving the rod 26 towards the curved bottom portion of the J channels 56, 58 until the rod 26 engages the bottom portion of the interior of the J channels 56, 58 thus snapping the locking finger 62 into a position where the angled surface 66 on the end of the locking finger will engage an outer surface of the rod 26 and secure the rod 56 between the locking finger 62 and the interior surfaces of the J channel 56, 58. This will positively lock the rod 26 thus creating a positive lock for the connector assembly 10 and the airbag chute 18. Hence, the airbag chute 18 will be secured between the seat back frame 20 and the side airbag seam 16. The design of the connector assembly 10 may allow for a visual and/or audible confirmation to the installer that the connector assembly 10 is properly locked. The audible confirmation will be in the form of a clicking noise when the rod 26 engages with the bottom portion of the J channel 56, 58 and the angled end 66 of the locking finger 62 such that the locking finger 62 will be snapped back towards its home or natural position thus creating a clicking noise therefrom. The visual confirmation will be that the rod 26 is directly aligned with the bottom surfaces of the J channels 56, 58 on the clip member 28 of the connector assembly 10. The use of the rod 26 and clip member 28 will also allow for a quicker and easier installation of the entire side airbag module 14 including the airbag chute 18 within the vehicle seat 12 thus reducing manufacturing costs and manufacturing time. It also will allow for easier removal of the side airbag chute after deployment of the airbag thus allowing for a new airbag module to be installed therein.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A connector assembly for use with a side airbag in a vehicle seat, said assembly including:
    a clip member having a slot near one end thereof;
    an inner chute connected to said clip member via said slot;
    a rod releaseably secured to said clip member; and
    an outer chute connected to said rod.

2. The assembly of claim 1 wherein said clip member has a generally J-shaped locking channel.

3. The assembly of claim 2 wherein said clip member has a second generally J-shaped locking channel aligned within said J-shaped locking channel.

4. The assembly of claim 3 wherein said clip member has a finger arranged between said first and second J-shaped locking channels.

5. The assembly of claim 4 wherein said finger has an angled surface or generally circumferential groove near an end thereof, said rod engages said groove or said angled surface when said rod is secured in said clip member.

6. The assembly of claim 5 wherein said finger urges said rod in a direction away from a surface of said clip member, said urging will engage said rod against a surface of said J-shaped locking channel to create a secure connection therebetween.

7. The assembly of claim 1 wherein said rod and clip member will provide an audible or visual confirmation of a secured locking engagement therebetween.

8. The assembly of claim 1 wherein said rod is made of a metal material.

9. The assembly of claim 1 wherein said rod has a predetermined length and diameter.

10. The assembly of claim 1 wherein said rod is arranged in a pocket of said outer chute, said pocket having at least one gap or window therein allowing said rod to be exposed to said clip member.

11. A seat having a deployable side airbag, said seat including:
    a trim cover;
    a frame arranged within the seat;
    a side airbag module connected to said frame;
    a first chute member connected to said trim cover at a seam;
    a second chute member connected to said trim cover at said seam;
    a clip member connected to an end of said first chute member; and
    a rod connected to an end of said second chute member, said rod is positively locked with said clip member to secure said chutes at a predetermined position during deployment of the airbag from the seat.

12. The seat of claim 11 wherein said clip member has at least one J-shaped locking channel.

13. The seat of claim 12 further including a locking finger arranged adjacent to said J-shaped locking channel, said locking finger having an angled surface on one end thereof.

14. The seat of claim 13 wherein said locking finger urges said rod into contact with a surface of said J-shaped locking channel to positively lock said rod to said clip member.

15. The seat of claim 13 wherein said rod engages said angled surface and is arranged within said J-shaped locking channel when said rod is positively locked with said clip member.

16. The seat of claim 12 further including a second J-shaped locking channel arranged in a plane with said J-shaped locking channel.

17. The seat of claim 12 wherein said clip member has a slot, said slot is on an end opposite said J-shaped locking channel.

18. The seat of claim 11 wherein said rod and said clip member provide an audible or visual confirmation of said positive lock therebetween.

19. The seat of claim 11 wherein said second chute member has a sleeve or pocket on an end thereof, said rod is arranged within said sleeve or pocket.

20. A seat for use in a vehicle, the seat having a side airbag module connected to a frame within the seat, the seat having a trim cover with at least one seam therein, an outer chute member and an inner chute member are connected to the seam on one end and to a connector assembly arranged in the seat on the opposite end thereof, said connector assembly including:
    a clip member having a slot near one end thereof, the inner chute member is arranged through said slot to secure one of the chute members to said clip member, said clip member having a first and second J-shaped channel arranged on an end thereof opposite of said slot, a finger is arranged between said first and said second J-shaped channel, said finger having a predetermined angled surface at one end thereof; and
    a rod releaseably engageable with said first J-shaped channel, said second J-shaped channel and said angled surface of said clip member, said rod is secured within a pocket at the end of one of the chute members, said rod is positively locked to said clip member around the frame and side airbag module to provide the inner and outer chute members the ability to guide the deployment of the side airbag through the seam of the seat.

* * * * *